United States Patent
Brockbank et al.

[15] 3,657,952
[45] Apr. 25, 1972

[54] APPARATUS FOR SELECTIVELY CUTTING AND CONVEYING SHEET MATERIAL

[72] Inventors: Peter A. Brockbank, 50 Lakeside Avenue, Bolton, Lancashire; Keith B. Spencer, 48 Fairfield Gardens, Stockton Heath, Cheshire; Reginald Ian Greaves, 95 Briony Avenue, Hale, Cheshire, all of England

[22] Filed: Feb. 20, 1970

[21] Appl. No.: 13,152

[52] U.S. Cl. ................................ 83/102, 83/408, 83/433, 83/466, 83/488, 83/519, 83/563
[51] Int. Cl. ........................................................ B65h 35/04
[58] Field of Search ............... 83/47, 71, 408, 102, 107, 466, 83/563, 519, 488, 433

[56] References Cited

UNITED STATES PATENTS

| | | |
|---|---|---|
| 2,747,664 | 5/1956 | Corson .................................. 83/408 |
| 3,200,688 | 8/1965 | Feeney et al. ........................ 83/466 X |
| 3,224,307 | 12/1965 | Kinker ................................ 83/408 X |
| 3,296,911 | 1/1967 | McLane ................................ 83/408 |
| 3,522,825 | 8/1970 | Wehner ................................ 83/47 X |

*Primary Examiner*—Frank T. Yost
*Attorney*—William J. Daniel

[57] ABSTRACT

Apparatus for cutting rectangular areas of any predetermined size and width from a larger piece of sheet material including a transverse cutting head, a plurality of longitudinal cutting heads, each cutting head being selectively movable into and out of cutting position, drive means for traversing the transverse cutting means across the width of the sheet material, a latching mechanism for positively locating the transverse cutting means at one of a plurality of predetermined locations across the material width, and an interlock cooperating between the transverse and longitudinal cutting means to rest the movement of the transverse cutting means at at least one selected position relative to the longitudinal cutting means.

5 Claims, 8 Drawing Figures

APPARATUS FOR SELECTIVELY CUTTING AND CONVEYING SHEET MATERIAL

This invention relates to apparatus for selectively cutting and conveying sheet material and particularly though not exclusively to such apparatus for use in a machine for dispatching predetermined lengths of material in the form of paper-wrapped rolls ready for delivery to a purchaser. Said machine consists basically of a feed table for delivering a supply of sheet material to a cutting station, a measuring device adapted to arrest the material feed when a required length has been delivered, a cutter in the cutting station for cutting off said required length, a conveyor for conveying said cut piece to a rolling station where it is rolled by peripheral contact with a plurality of rollers, and a paper wrapper delivering device adapted to cut a measured piece of wrapper from a supply roll thereof and to deliver said wrapper to the rolling station where it is wrapped around the rolled length of material.

The object of the present invention is to provide, for use in a machine of the kind referred to, apparatus for selectively cutting and conveying sheet material so that pieces thereof having predetermined length and width can be cut from a supply roll of standard width and can then be conveyed, rolled and wrapped by the machine.

According to the present invention, there is provided apparatus for selectively cutting and conveying sheet material comprising conveying means; a first cutter for cutting said material in one direction; a second cutter for cutting said material in a direction normal to that of said first cutter; and means for separately and selectively moving said cutters into and out of cutting engagement with said material; such that the cuts made respectively in said material by said cutters can be arranged to coincide to produce a cut piece of material of predetermined dimensions taken from within the area defined by the edges of an uncut piece of material supplied to the apparatus.

An embodiment of the invention will now be described, by way of example only, with reference to the accompanying drawings in which:

FIGS. 1A, 1B and 1C together comprise a side elevation of a machine of the kind referred to including in FIG. 1B, said apparatus of the kind referred to;

Figure 1A:
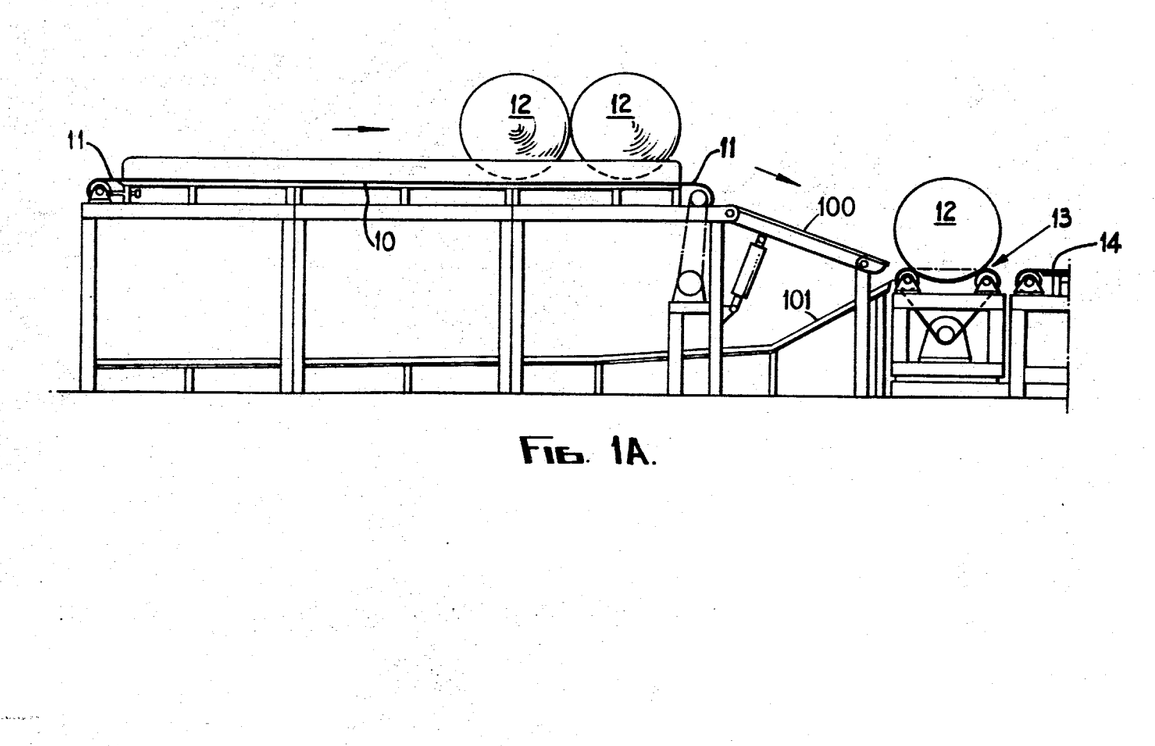
Figure 1B:
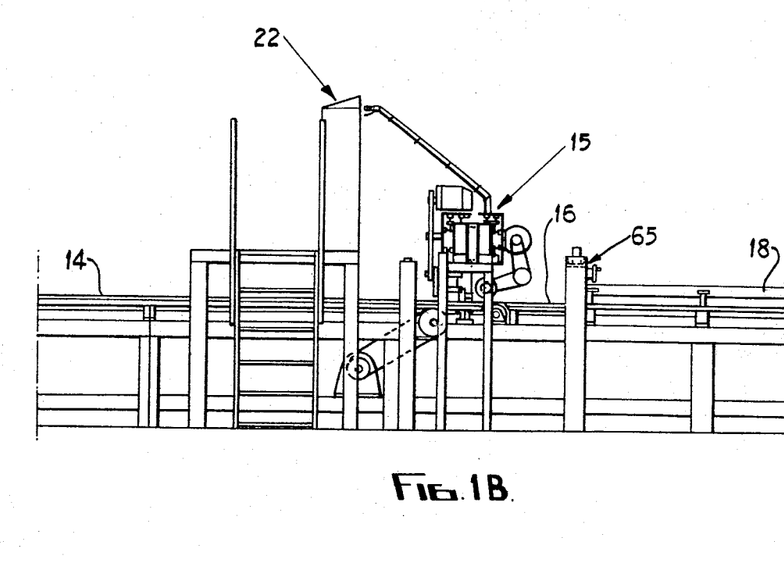
Figure 1C:
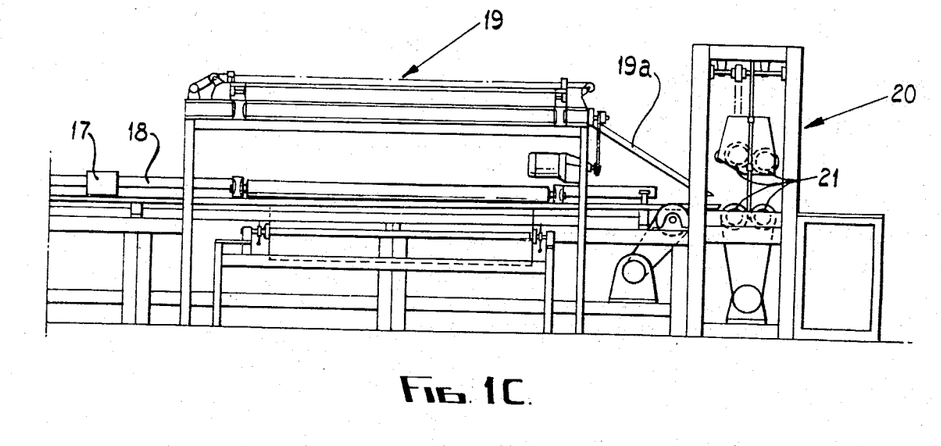

A machine of the kind referred to includes a feed table 10 having a driven conveyor belt 11 adapted to deliver a supply roll 12 of, for example, carpet onto a driven cradle 13 adapted to unroll the carpet onto a first conveyor table 14. The table 14 terminates at a cutting station generally indicated at 15, of which a detailed description will follow, on the other side of which is a second conveyor table 16 having a photo-electric measuring device 17 which is adjustable in position along the table 16 on a rail 18. The conveyor table 16 passes beneath a paper wrapper delivering device generally indicated at 19 which is adapted to deliver a measured and cut length of paper wrapper down an inclined platform 19a to a rolling station 20 where a cut length of carpet coming from the cutting station 15 is rolled by the nip between four friction rollers 21 prior to being wrapped by the paper wrapper.

The operation of the whole machine is carried out from a control console and parts of said operation are effected automatically by photo-electric sensing devices located at various positions on the machine.

The machine is arranged, with the particular use of the cutting station 15 to be described, to measure, cut, convey, roll and wrap pieces of carpet of preselected length and width according to customers' requirements in a rapid and accurate manner, thus saving the time and effort needed to carry out such operations manually.

The cutting station 15, the parts of which are shown more clearly in FIGS. 2 to 6, includes a pair of beams 30, 31 extending across the machine at a position above and between the two conveyor tables 14 and 16.

Figure 2:
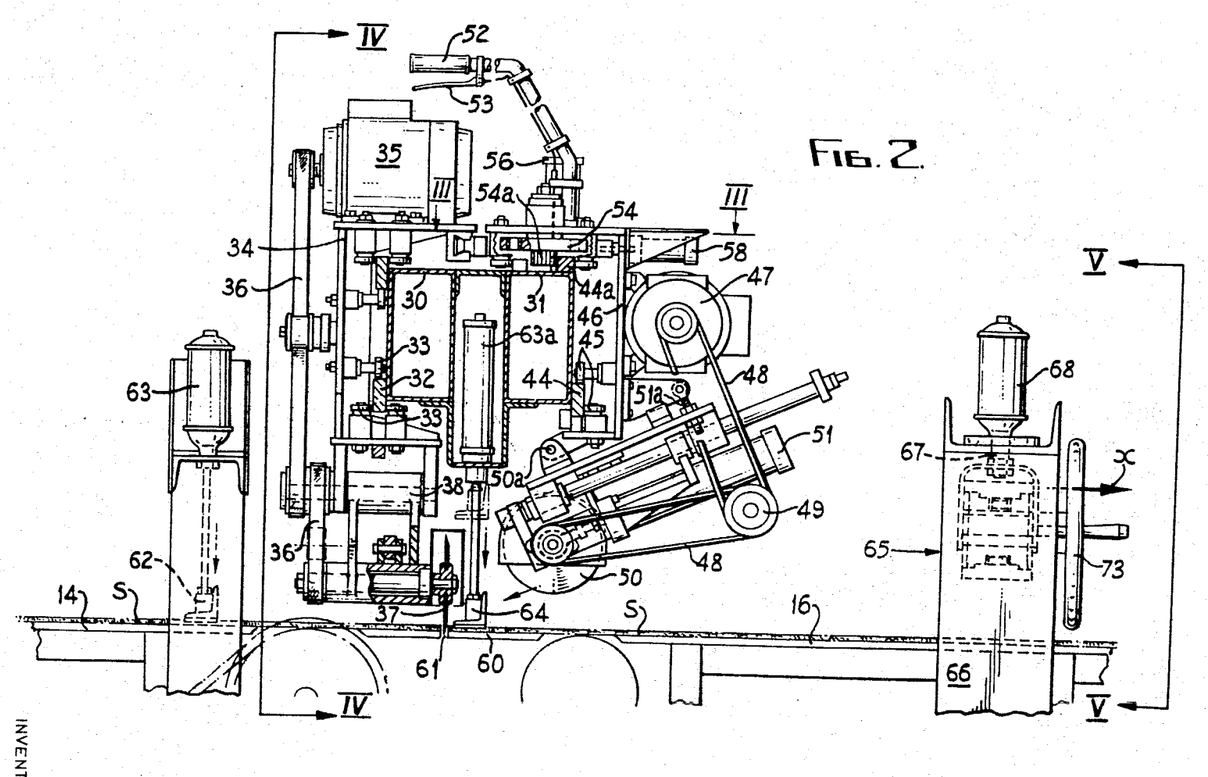
FIG. 2 is an enlarged part sectional view of said apparatus, taken on line II—II of FIG. 4.

The beam 30 has fixed rails 32 on which run rollers 33 supporting a framework 34. The framework 34 carries a motor 35 which, through belts 36, drives a circular cutter blade 37. The blade 37 is arranged to pivot about a shaft 38 by means of a pneumatic cylinder 39 and is thus arranged to be moved into or out of an operative position in which, as shown in FIG. 2, it is arranged to cut the carpet S transversely. The framework 34 is arranged to travel across the machine by means of a chain 40 (see FIG. 4) to which the framework is attached. The chain 40 passes round sprockets 41 driven by a motor 42 and connected thereto by a belt 43. The framework 34 and the components supported thereby will hereinafter be referred to as the cross-cut head.

The beam 31 has a fixed rail 44 on which run rollers 45 supporting a framework 46. The framework 46 carries a motor 47 which, through belts 48 and a pivoting drive pulley assembly 49, drives a circular cutter blade 50. The latter is so mounted on the framework that, by operation of a pneumatic cylinder 51, the blade 50 can be linearly moved into or retracted from an operative position. In FIG. 2, the blade 50 is shown retracted and as can be seen from that figure, the blade 50 is arranged to cut carpet along its length, i.e. normal to the cutting action of the blade 37.

The assembly comprising the blade 50 and its associated parts is pivotally mounted at 50a on the framework 46 and is adjustable about the point 50a by means of a bolt and lock nut arrangement 51a. Thus the correct cutting location for the blade 50 in its operative position can be pre-set.

Figure 3:
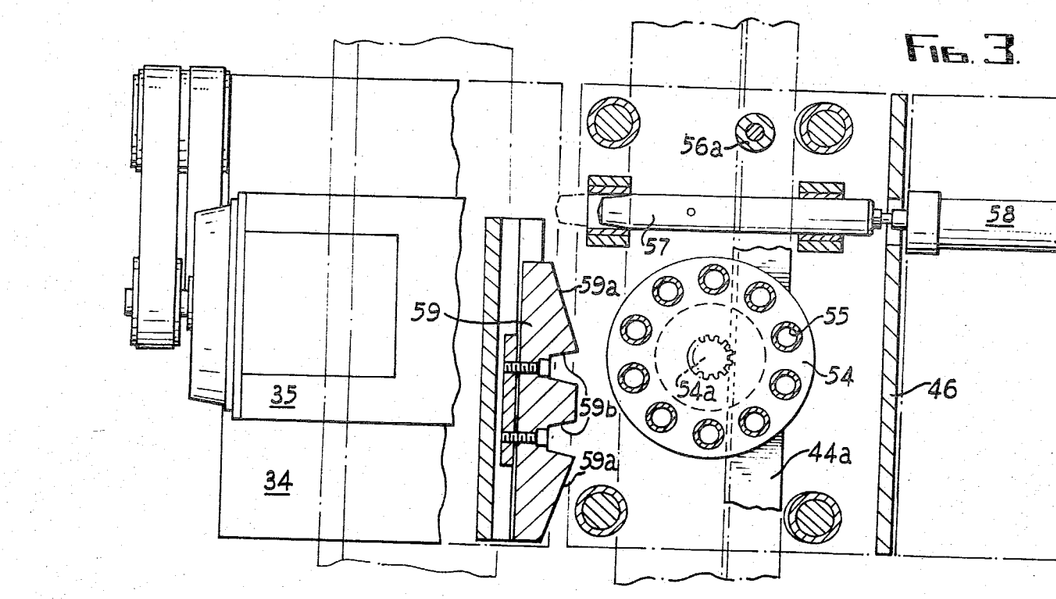
FIG. 3 is a part-sectional plan view of the apparatus of FIG. 2, parts having been omitted for the sake of clarity.

The framework 46 carries a handle 52 for moving it along the rails 44, i.e. across the machine, and a spring-loaded plunger having a release handle 53 is adapted to engage one of a number of location apertures 55 spaced apart around the peripheral region of a disc 54 (see FIG. 3). The disc 54 has attached thereto a pinion 54a which meshes with a rack 44a mounted on the beam 31 so that as the framework 46 is moved along the beam 31 the disc 54 is caused to rotate. It can be seen therefore that the available stopping positions of the framework 46 along the beam 31 are determined by the angular spacing of the apertures 55 around the disc 54. A pneumatic cylinder 56 is also provided whose ram carries a pressure pad 56a adapted to clamp down onto the upper surface of the beam 31 and positively lock the framework 46 in a selected position. The framework 46 and the components supported thereby will hereinafter be referred to as a slitting head.

Figure 4:
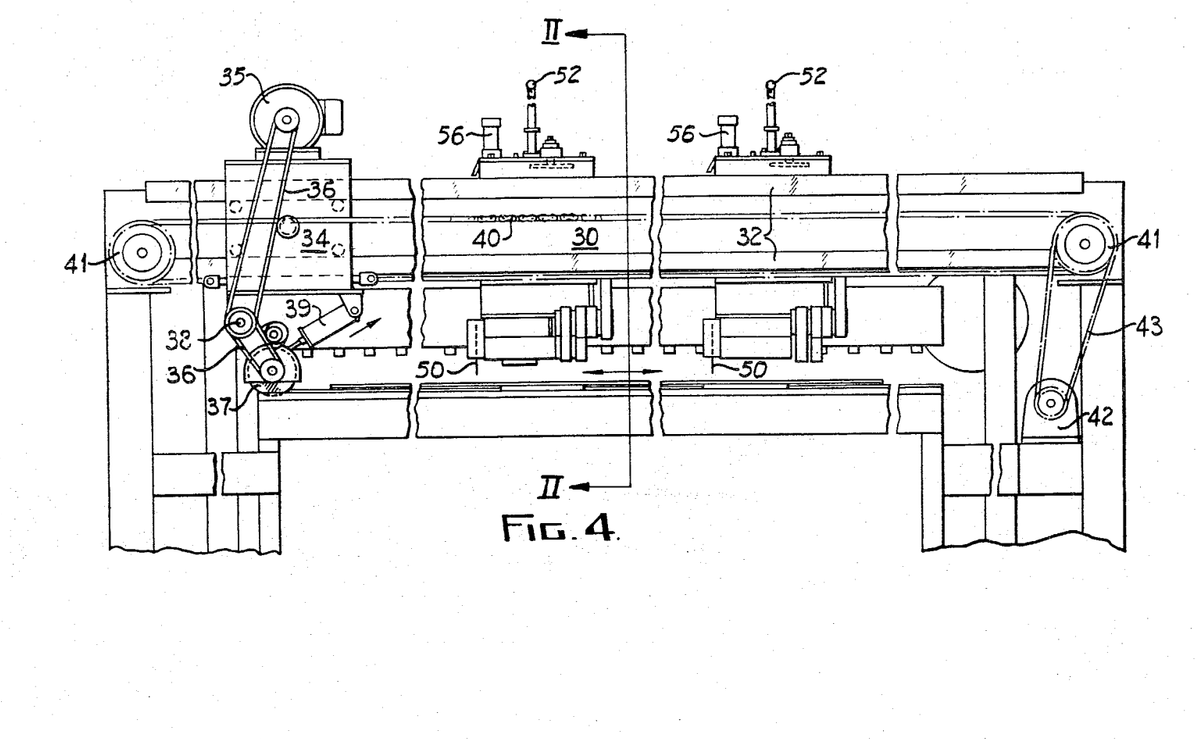
FIG. 4 is a view taken on line IV—IV of FIG. 2.

Any number of slitting heads may be mounted on the beam 31 (two are shown in FIG. 4).

A plunger 57 controlled by a pneumatic cylinder 58, is provided on each slitting head, and a locking member 59 having inclined ramps 59a and recesses 59b is provided on the cross-cut head (see FIG. 3). With the plunger 57 advanced by the action of the cylinder 58 to the position shown in chain dotted lines in FIG. 3 then when one of the ramps 59a contacts the end of the plunger during movement of the cross-cut head, the plunger will be caused to rise up the ramp and become engaged in the adjacent recess 59b. This action, as will be described, serves to arrest the cross-cut head in a selected position relative to that of the slitting head.

A cutting table 60 is provided between the conveyor tables 14 and 16 and has a slot 61 extending transversely with respect to the machine to accommodate the cross-cut blade 37 in use, together with a plurality of other slots (not shown) extending normal to the slot 61 and corresponding with the location apertures 55 thus to accommodate the slitting blade or blades 50 in use.

Mounted upstream, i.e. to the left with respect to FIG. 2, of the cross-cut head is a first clamp 62 operated by a pneumatic cylinder 63 and adapted to clamp the carpet S against movement as will be described. Mounted downstream of the cross-cut head is a second clamp 64 operated by a pneumatic cylinder 63a. Again this clamp is adapted to retain the carpet S on the table 60.

Figure 5:
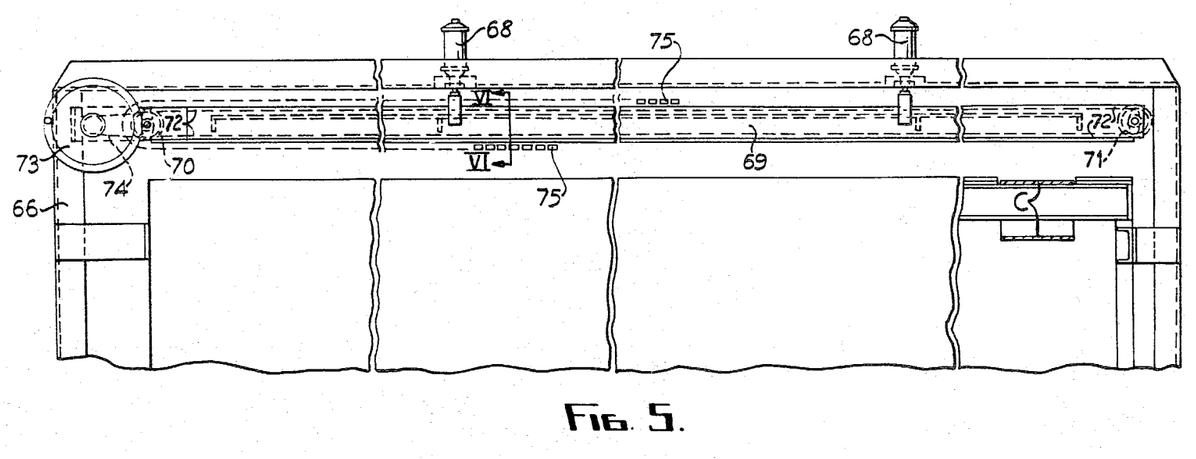
FIG. 5 is a view taken on line V—V of FIG. 2, showing part only of the apparatus shown in that figure.

Downstream of cross-cut and slitting heads is a variable clamp arrangement 65 which bridges the second conveyor table 16. The variable clamp 65 (see FIGS. 5 and 6) comprises a frame 66 from which is suspended, by the rams 67 of two pneumatic cylinders 68, a beam 69. At each end of the beam 69 is rotatably mounted a chain sprocket 70, 71 carrying a continuous chain 72. The chain 72 is arranged to be driven by means of, for example, a hand wheel 73 attached, via a belt 74, to the sprocket 70. Attached to the chain 72 over, for example, half of its length are a plurality of closely adjacent blocks 75, of, for example, aluminium. As can be seen from FIG. 5, the blocks 75 can be arranged to extend across the whole or part of the conveyor table 16 by rotation of the handwheel 73. The table 16 consists of a plurality of parallel spaced apart conveyor belts C arranged to travel over a stationary table. In the region of the variable clamp 65, the table is raised in the spaces between the belts C as indicated in FIG. 5.

Figure 6:
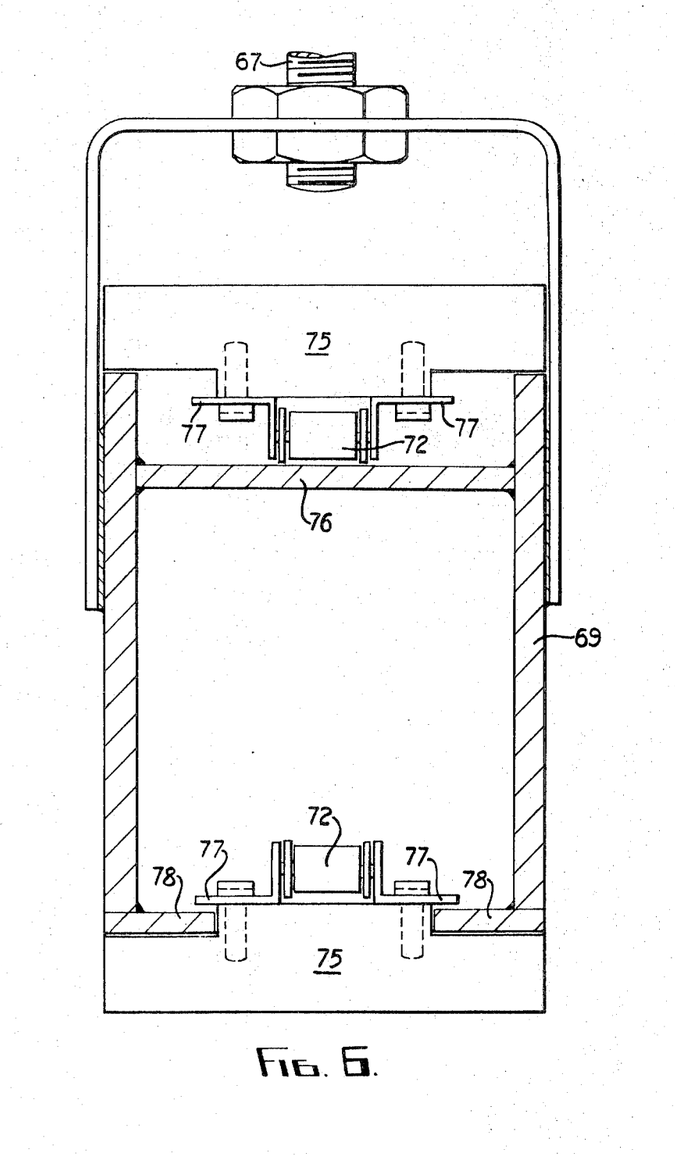
FIG. 6 is a section taken on line VI—VI of FIG. 5.

The chain 72 is supported on its upper run on a platform 76, and on its lower run it is prevented from sagging by virtue of flanged chain links 77 to which the blocks 75 are attached and which run along flanges 78 extending along the base of the beam 69.

The whole beam 69 can be lowered by the cylinders 68 so that the blocks 75, as far as they are set to extend across the table 16, rest on the raised part of the latter to clamp and retain that part of the carpet trapped by the blocks 75.

In use, with the variable clamp 65 and the fixed clamps 62 and 64 raised and with the cross-cut blade 37 pivoted away from the table 60, carpet S is fed along the second conveyor in the direction of the arrow X (see FIG. 2) with any or all of the slitting heads operating to cut the carpet longitudinally at preselected positions across its width until such time as the preset measuring device 17 senses the leading edge. The conveyors 14 and 16 are thus stopped and all slitting blades 50 are retracted. Simultaneously, the first and second clamps 62 and 64 are lowered onto the carpet and the cross-cut blade 37 can then be pivoted into its operative position to cut the carpet transversely over any part of its width as required. The cross-cut head is arranged to traverse the carpet from any selected starting position and may be required to continue its cutting operation until it reaches an edge of the carpet. Alternatively the cut being performed may be required to extend only as far as that previously performed by, say, the next adjacent slitting head blade. In this case, the cross-cut head continues to travel until it contacts a micro-switch on said next adjacent slitting head, whereupon the motor 42 will be caused to stop. The inertia of the head causes it to continue moving until it is physically stopped due to the plunger 57 on the slitting head entering the nearest recess 59b on the member 59. The two recesses 59b are provided so that, regardless of the direction of travel of the cross-cut head, the latter will always locate itself correctly relative to said slitting head. The plunger 57 must be retracted before the motor 42 is re-started.

Clearly, if the cross-cut head is required to travel beyond the next adjacent slitting head the micro-switch on that head would be de-energised by the machine operator.

It will be seen that the points at which any of the slitting blades can cut the carpet lie in a straight line which is arranged to coincide with a line along which the cross-cut blade is arranged to travel so that the cuts performed respectively by the slitting head or heads and the cross-cut head can be arranged, if required, to coincide, and by virtue of the interlocking of the two heads by means of the plunger 57 and the member 59, any "overshoot" of the cuts can be avoided.

Thus one or more pieces of carpet can be completely cut and the variable clamp is then adjusted and lowered so that, for example, one or more cut pieces can be held by the blocks 75, whilst the other cut piece or pieces are conveyed preferably one at a time to the rolling station 20 to be rolled and wrapped ready for despatching according to requirements. Subsequently the variable clamp 65 and the fixed clamps 62 and 64 are raised, the slitting blade or blades can be lowered into position and the carpet once again conveyed forwardly until another desired length on the same or a different part of the carpet has been slitted, whereupon the cross-cut blade is once again rendered operative to cut off the desired length.

Thus, with the apparatus according to the invention, it is possible to obtain from a carpet supply roll, a number of pieces of carpet of any length (less than the total length of the roll) and of any one of a number of standard widths which can be selected in accordance with the fixed location points available for the slitting heads. Furthermore pieces of carpet of any shape can be cut off from within the area defined by the edges of an uncut piece of carpet fed to the apparatus, provided that that shape can be defined by right angled corners and straight sides. It is to be understood that the shaped piece of carpet actually required can be the cut piece or alternatively the remaining part of the supply material. In this manner, a carpet for a particular room can be produced having, for example, cut-outs for fireplaces, etc. Also each piece cut can be separately conveyed, rolled and wrapped.

Any remaining parts of the supply roll can be rewound by reversing the action of the cradle 13, lifting a platform 100 (see FIG. 1) and causing the re-wound roll to be tipped into a chute 101. The platform 100 is then lowered once again and a new supply roll can be located on the cradle 13.

It should be appreciated that any of the operation of the apparatus heretofore described and/or the operation of the machine as a whole can be automated and programmed to produce cut pieces of carpet or other material according to customers' requirements, without the necessity for manual pre-setting of the various adjustable and moving parts. Any of the known forms of programme medium could be used such as punched or magnetic tape fed to a computer.

We claim:

1. Apparatus for conveying sheet material and for cutting rectangular areas of predetermined width and length from said material comprising:
   a. conveying means (14,16) for said sheet material,
   b. a cross-cut head having a traversing cross-cutting means (37) for cutting across the sheet material,
   c. at least two slitting heads having longitudinal cutting means (50) for cutting along the sheet material,
   d. powered means (39,51) for separately and selectively moving said cutting means into and out of cutting engagement with said material,
   e. powered means (44) for driving said cross-cut head across the sheet material,
   f. means (53,54,55) for positively locating said slitting heads at predetermined locations across the sheet, and
   g. cooperating detent means on said cross-cut head and said slitting heads operable to arrest the movement of said cross-cut head at at least one selected position relative to said slitting heads.

2. Apparatus as claimed in claim 1 wherein said detent means comprises a retractable plunger on the slitting head and at least one recess on the cross-cut head for engaging the projected plunger.

3. Apparatus as claimed in claim 2 wherein said detent means has two recesses disposed side by side and an inclined ramp leading up to both recesses whereby said heads can be correctly positioned relative to each other regardless of the direction of travel of said cross-cut head.

4. Apparatus as claimed in claim 1 in which a variable clamp is provided for clamping a predetermined portion of said material and prevent it from moving while a cut portion is conveyed away from said variable clamp comprising a plurality of clamping blocks adjustable in position across said conveying means, whereby when a piece of material has been cut, some or all of the remaining materials can be clamped by said blocks while the cut piece remains unclamped and can be removed by said conveying means.

5. Apparatus as claimed in claim 1 wherein said means for positively locating said slitting heads comprises a disc mounted for rotation on the slitting head, said disc having thereon a pinion which meshes with a fixed transverse rack, said disc having therein a number of location apertures adapted to receive a plunger, and a plunger fixed on said slitting head and selectively operable to enter one of said apertures and prevent said disc from rotating.

* * * * *